Figure 3:
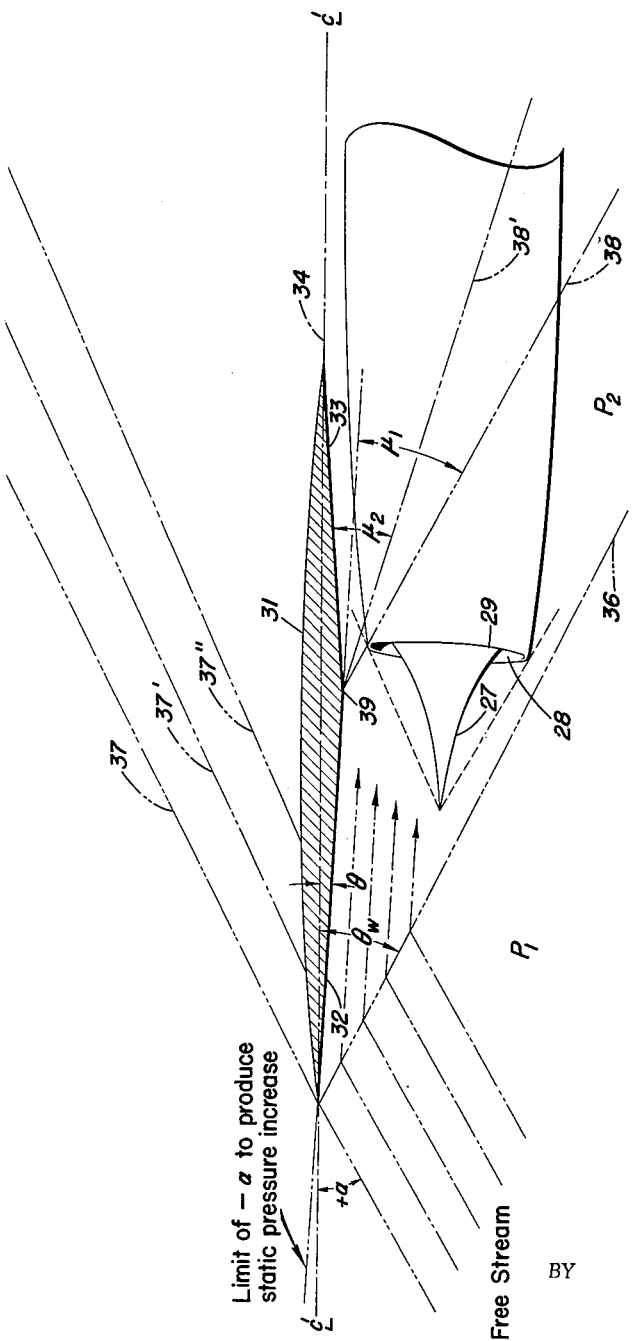

Aug. 22, 1961     J. H. WALKER     2,997,256
SUPERSONIC AIRCRAFT
Filed Jan. 14, 1955     3 Sheets-Sheet 1
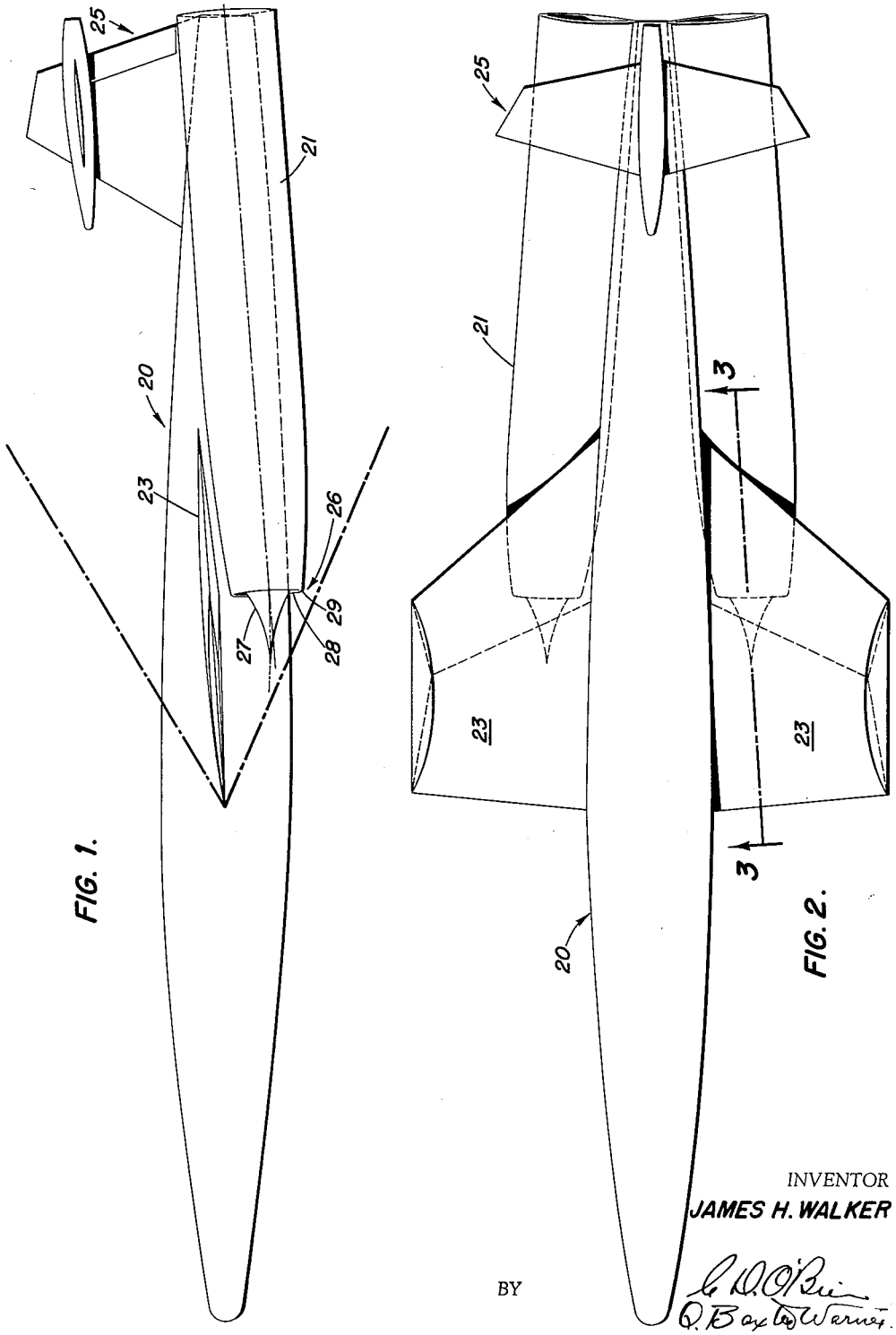
INVENTOR
*JAMES H. WALKER*
BY
ATTORNEYS Aug. 22, 1961   J. H. WALKER   2,997,256
SUPERSONIC AIRCRAFT
Filed Jan. 14, 1955   3 Sheets-Sheet 2

JAMES H. WALKER
INVENTOR

JAMES H. WALKER
INVENTOR

United States Patent Office 2,997,256
Patented Aug. 22, 1961

2,997,256
SUPERSONIC AIRCRAFT
James H. Walker, Silver Spring, Md., assignor to the United States of America as represented by the Secretary of the Navy
Filed Jan. 14, 1955, Ser. No. 481,980
2 Claims. (Cl. 244—15)

The present invention relates to jet-propelled, supersonic aircraft. In particular, it relates to a novel integrated configuration of a jet engine inlet diffuser and an aerodynamic surface, the integrated configuration providing more favorable diffuser operation than can be obtained by operating the diffuser separately in the free stream.

The performance of supersonic aircraft propelled by jet engines depends to a large extent upon the pressure recovery provided by the diffuser. Ordinarily, pressure recovery is effected by the use of single or multiple shock wave diffusers. As has long been recognized, the efficient operation of shock type diffusers requires that the inlet flow conditions be stabilized to prevent spillover or swallowing of the diffuser shock waves.

A brief treatment of the adverse conditions of spillover and swallowing is given on page 266 in the book "Aircraft Jet Power Plants" by Franklin P. Durham, Prentiss-Hall publishers, 1951. As demonstrated in the work cited, spillover and swallowing can occur by the operation of the diffuser at speeds less or geater than the design Mach number. An evident solution to the improper speed causes of spillover and swallowing is the employment of a throttle control system designed to maintain the speed constant at the desired Mach number.

Another and more insidious way in which spillover or swallowing can occur is by variations in the angle of attack of the diffuser with respect to the free stream. Prior to the present invention, it was necessary carefully to design jet-propelled aircraft to confine the variation in the diffuser angle of attack to small values for normal flight conditions or to effect a large compromise in fuel economy. Since no further control could be enforced upon the spillover and swallowing losses arising from angle of attack variations, they were tolerated as necessary reductions in efficiency. Obviously, as the range of supersonic aircraft operation is extended, losses formerly ignored become an important consideration.

It is therefore an important object of the present invention to provide a means for stabilizing the conditions of flow in the inlet to a jet engine when exposed to variations in the angle of attack, and thus improve the operating efficiency of the engine.

Another object of the present invention is the utilization, as an additional stage of engine compression, of the shock waves inherently present in the operation of a supersonic aircraft, thereby to provide increased efficiency even beyond the improvement provided by the attainment of the first-named object.

Another object of the present invention is to remove former restrictions upon the maneuvering of supersonic aircraft imposed by spillover and swallowing conditions.

A further object of the present invention is to increase the overall efficiency of operation of a supersonic aircraft thereby allowing operation at extended range.

Other objects and many of the attendant advantages of this invention will be readily apreciated as the same becomes better understood by reference to the following detailed description when considered in connection with the accompanying drawings.

Briefly, the present invention provides an inlet diffuser located downstream from a plane surface, generally comprising the wing of the aircraft. By arranging the diffuser axis to be parallel to the surface, the air flow into the engine diffuser will be axial with the diffuser, even under varying angle of attack conditions.

Figure 4:
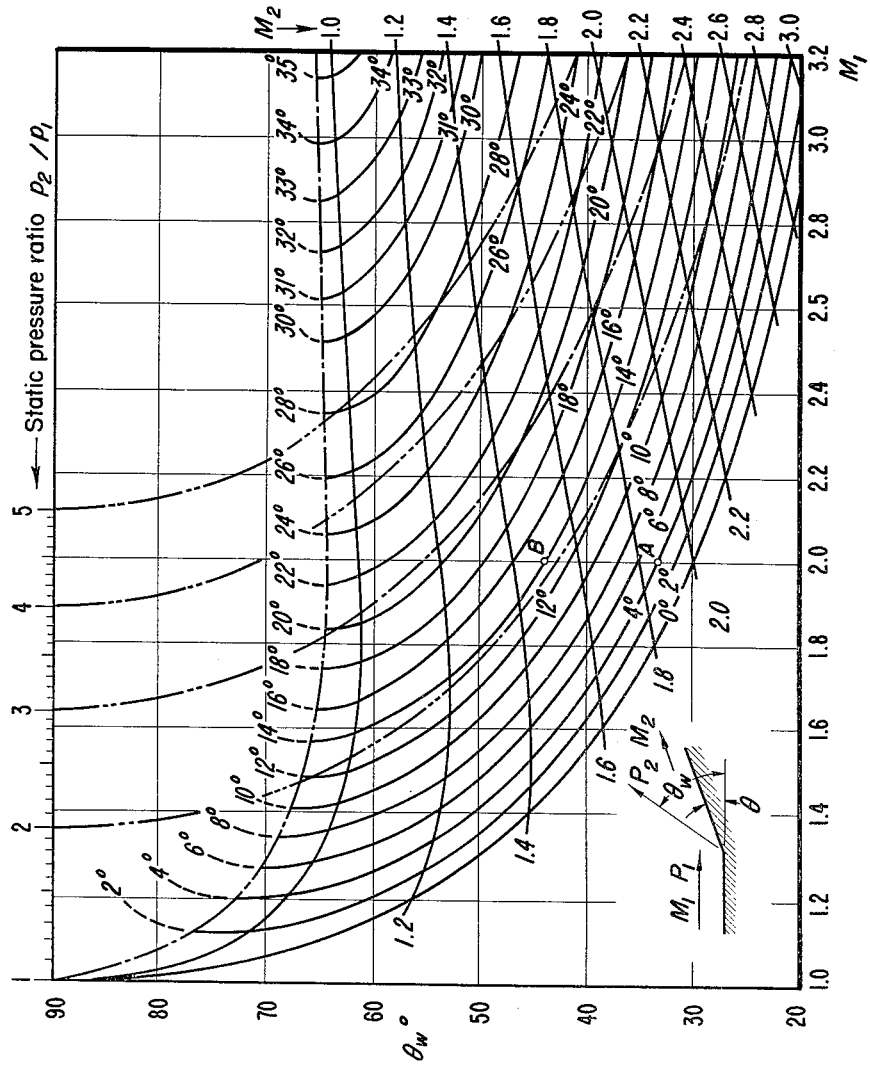

In the drawings:
FIG. 1 is a view in elevation of a ramjet propelled supersonic aircraft incorporating the present invention;
FIG. 2 is a plan view of the aircraft shown in FIG. 1;
FIG. 3 is a diagram of the flow conditions of the wing-diffuser combination constructed in accordance with the present invention and including a sectional view of the aircraft wing along the line 3—3 and the diffuser portion of the ramjet engine; and
FIG. 4 is a composite chart of the properties of air at supersonic speeds and for various deflection angles.

FIGS. 1 and 2 illustrate a supersonic aircraft embodying an integrated wing-diffuser configuration in accordance with the present invention. The airframe, shown generally at 20, of the aircraft has mounted thereupon wings 23 to provide lift and ramjet engines 21 to deliver propulsive forces.

The aircraft includes a conventional empennage 25 for stabilization and control. A conventional diffuser 26 is provided to increase the pressure of the air charge consumed in the engine combustion process. The diffuser may suitably comprise the multiple shock type which includes an inner body 27 having an isentropic spike. The inner body 27 is centrally positioned within the inlet duct 28 which is defined by the lip 29 of the engine cowling. In addition, there are provided accessories essential to operate the engine such as fuel, fuel supply means, igniters, etc. The aircraft may be steered either under the control of a pilot, remotely, or automatically by any suitable means.

As both the right and left wing-engine combinations are identical, it is necessary to consider but a single combination in order that this invention may be understood. Twin engines are provided in the embodiment shown, primarily with a view toward improving the aerodynamic configuration of the aircraft. Moreover, greater ease in disassembling the engines for test, maintenance, overhaul or substitution is thereby provided. As will become obvious as an understanding of the invention is gained, there is no limitation of the invention to mid-wing, twin-jet aircraft. The advantages to be realized by practicing the present invention are also to be gained in single or multi-engine installations and for any suitable airfoil type or wing-body configuration.

In FIG. 3 there appears a more detailed presentation of the flow conditions prevailing for the integrated wing-diffuser combination. The wing 23 comprises an airfoil including a curved upper surface 31, a forward lower surface 32 and an aft lower surface 33 as may suitably be formed by dihedral planes. The chord line 34, passing through the leading and trailing edges of the wing, serves as a reference for defining the angle of attack $\alpha$, which is the angle between the free stream air flow and the chord line. The angle $\theta$ of the intersection of the plane forward surface 32 with the chord line shall hereinafter be referred to as the wing deflection angle.

A shock wave 36 and expansion waves 37, 38, 38' are shown as they would normally occur during supersonic flight. Air entering the shock wave 36 from the free stream region is deflected to flow in streamlines parallel to the surface 32 of the wing. Inasmuch as parallel flow will always prevail, except in the case of boundary layer separation, it can be seen that irrespective of the angle of attack, air enters the diffuser inlet from a direction parallel the forward lower surface 32 of the wing. Therefore, in order that the maximum capture area be presented by the diffuser to the entering air, preferably the inner body axis is parallel, and the inlet is perpendicular, to the streamlines. Thus, as the diffuser bears a fixed relationship with the wing, changing its angle of attack equally with the wing, it follows that spillover or swallowing cannot be induced by variations in the angle of attack.

Another advantage of the wing diffuser combination can be deduced from the very function of the wing, namely its ability to produce lift. Lift is but a manifestation of the excess of the pressure acting upon the lower surface of the wing over the pressure acting upon the upper surface thereof. As the aircraft is normally operated so that lift is delivered by the wing, the diffuser is positioned in a region having increased pressure and temperature over ambient atmospheric conditions. Since the wing shock wave has relatively high pressure recovery, higher overall pressure recovery and therefore greater efficiency can be attained by the wing-diffuser combination than can be attained by the diffuser alone.

While the increased pressure recovery available in the wing-diffuser combination has been set forth in the case of a wing delivering lift, it should be understood that increased pressure recovery is likewise to be had in certain cases wherein the wing delivers no lift. Indeed, although wing structure is preferred as the stabilizing and pressure increasing element of the combination, in its basic form, the invention simply comprises a suitable surface positioned forward of the inlet diffuser. Such a surface should preferably be plane so that the flow conditions will be uniform across the face of the diffuser inlet. If, however, a wedge or similar airfoil type is utilized, increased pressure recovery is provided for all positive angles of attack and for negative angles of attack not exceeding in magnitude the wing deflection angle $\theta$.

To deal with the above-mentioned pressure increase in greater detail it should be noted that practically, in order to fulfill structural requirements of strength, airfoils have a certain thickness. The airfoil thickness is seldom uniform along the chord length, but rather tapers toward maximum thickness near midchord and thereafter tapers to a thin trailing edge. Therefore, for zero angles of attack, air passing over a wedge type airfoil surface will be deflected to some extent.

A linear form of aerodynamic theory shows the ratio of the pressure of air passing through a shock wave and deflected an amount $\theta$ to be $$\frac{p_2}{p_1} = 1 + \frac{\gamma M^2}{\sqrt{M^2-1}} \theta \quad (1)$$

where $p_1$ is the pressure before the wave,
$p_2$ is the pressure after the wave,
$\gamma$ is the ratio of specific heats = 1.4 for air, and
M is the free stream Mach number.

From Equation 1 it can be seen that a pressure increase is available for any positive value of $\theta$ at supersonic speeds.

$\theta$ is conventionally regarded as being positive for all compression waves. That is, if the inclination of the plane surface to the flow reduces the distance between streamlines, a compression wave exists. Conversely, an increase in the distance between streamlines is characteristic of an expansion wave. Equation 1 is equally applicable to expansion or compression waves wherein the flow is deflected through small angles. In the case of an expansion wave, however, $\theta$ becomes negative.

For the derivation of Equation 1 and more exact expressions for the pressure change across a shock wave, reference is made to the book "Engineering Supersonic Aerodynamics" by E. Arthur Bonney, McGraw-Hill, 1950, pages 71 ff.

From the foregoing it is evident that increased static pressure is available for all angles of attack producing lift and even in the case of angles of attack not producing lift but sufficient to result in a compressive deflection of flow. As illustrated in FIG. 3, this latter condition is satisfied so long as $\alpha$ does not negatively exceed $\theta$.

Whenever the angle of attack is of sufficient negative magnitude to cause the shock wave 36 to become an expansion wave, the static pressure is, of course, less than the free stream static pressure. The effect is to decrease the air mass flow into the engine, and hence the thrust output of the engine. However, such a thrust reduction is to be desired for it will only occur when the aircraft is descending from a higher to a lower altitude, and in descent the aircraft is aided by gravity.

Thus another of the advantages of the wing-diffuser combination is made evident. Namely, that the engine thrust output is increased with increased lift requirements and reduced for reduced lift requirements.

In FIG. 3, several expansion waves are shown. They are the upper wing surface waves 37, 37', 37'', and the lower wing surface waves 38, 38'. Preferably, the diffuser inlet is located within the region bounded by the waves 36 and 38, thereby attaining the advantages of increased static pressure and uniform flow conditions.

Generally, of course, any aircraft represents a careful compromise among all the various considerations affecting its operation and performance. It is beyond the scope of the present invention to enter into the art of aircraft design except for the showing that the preferred inlet diffuser location can be determined definitely.

Assuming, for example, that the particular airfoil in FIG. 3 has been selected as having favorable lift/drag characteristics, etc. The angle, $\theta_\omega$ of shock wave 30 can be determined by reference to aerodynamic charts similar to that of FIG. 4.

Since in the case of expansive flow, the conditions of the gas gradually change, there will not be a single expansion wave generated at the corner 39 of the intersection between the forward and aft lower surfaces, but rather within the region bounded by the waves 38 and 38', a large number of waves may be drawn through the corner which are in reality local Mach waves. That is, in expanding from a lower Mach number to a higher Mach number, the gas gradually changes in velocity until its final Mach number is reached. The region of gradual change can be defined by an initial Mach wave inclined with the surface 32 at an angle $\mu_1$, and a final Mach wave inclined with the surface 33 at an angle $\mu_2$. The Mach wave is defined by $$\mu = \arc \sin \frac{1}{M} \quad (2)$$

Thus, if the initial and final Mach numbers of the flow along the surfaces are known, the region of gradual change can be determined.

It can be shown that the shock wave angle $\theta_\omega$ does not vary appreciably with the angle of attack. Since increased angles of attack produce increased pressure in the region bounded by the shock wave 36 and expansion wave 38, a corresponding reduction in the Mach number of the flow passing over the forward surface will occur. From Equation 2 it can be seen that a reduced Mach number will result in an increase in the angle $\mu$, and hence as the angle of attack increases, the expansion wave 38 moves forward. The position of the expansion wave defining the boundary of the preferred location of the diffuser inlet must therefore be determined at the maximum expected angle of attack.

Inasmuch as the angle of attack depends upon the airfoil design and other factors known to the designer, by virtue of wind tunnel tests, analytical studies, etc., the expected maximum angle of attack is likewise known. The limiting value of the expansion wave 38 therefore represents the second boundary enclosing the preferred region of diffuser location. The upper boundaries of the location region are, of course, the lower wing surfaces. It will be understood that it is generally inadvisable to locate the diffuser with its lip tangent to a wing surface, however, since there then arise certain undesirable boundary layer-diffuser interactions.

Merely by way of example to illustrate the determination of the preferred diffuser location region, let it be assumed that the aircraft is to operate at Mach number 2, that $\theta=4°$, and that the maximum angle of attack, $\alpha$ max, is equal to 10°.

Then, referring to FIG. 4, wherein there appears the relation between the quantities $M_1$ (the Mach number at which the aircraft cruises), $M_2$ (the Mach number after the shock wave), $\theta_\omega$ (the shock wave angle), and $p_2/p_1$, (the static pressure ratio). Following the $M_1=2$ line up to the point A of intersection with the $\theta=4°$ line, and referring to the left hand $\theta_\omega$ scale, there is noted the value $\theta_\omega=33°$. Then referring to the right hand $M_2$ scale for the value of the $M_2$ line passing through the point A, the value $M_2=1.83$ is found. Therefore, for zero angle of attack, $\theta_\omega=33°$, and $$\mu_1 = \text{arc sin}\frac{1}{1.83} = 33.2°$$

But it is desired to determine $\mu_1$ for the maximum angle of attack. This can be done from FIG. 4 by increasing $\theta$ by the angle of attack, that is $\theta_2=\theta+\alpha$. Following the procedure as set forth above with $\theta_2=4°+10°=14°$, and $M_1=2$, the $M_1$ line is followed up to the point B of intersection with the $\theta=14°$ line, there the values $\theta_{\omega 2}=44°$ and $M_2=1.5$ are noted. Then the value of $\mu_2$ defining the diffuser location region is approximately 42°. It will be observed that the shock wave angle $\theta_\omega$ obtained at an angle of attack of 10° is 44°. Recalling, however, that the angle $\theta$ was increased by the amount of the angle of attack in order to utilize the chart of FIG. 4 in the second instance, and that the relevancy of the shock wave angle is to establish a boundary related to the wing surface, then the increase of 10° in $\theta_2$ must be subtracted from $\theta_{\omega 2}$ in order to obtain the relevant shock wave angle. It therefore results that $\theta_\omega$ at 10° angle of attack is 34°. As can be seen, there is no significant change in $\theta_\omega$ as the angle of attack is changed. Either the shock wave angle obtained for zero angle of attack or that angle obtained at the maximum angle of attack can be applied with little change in the results. Thus, provided with the angles $\theta_\omega$ and $\mu_1$, the diffuser inlet can be located in accordance with the present invention. That is, within the preferred limits as herein defined, the diffuser may be located anywhere most advantageous to the overall aircraft configuration, and thereby gain the advantages possessed by this invention.

Obviously many modifications and variations of the present invention are possible in the light of the above teachings. It is therefore to be understood that within the scope of the appended claims the invention may be practiced otherwise than as specifically described.

What is claimed is:

1. A supersonic aerial vehicle of the jet-propelled type, comprising an airframe, a ramjet engine on said airframe and propelling the vehicle supersonically, and an airfoil on said airframe, said airfoil having a lower plane surface and developing a shock wave at the leading edge and an expansion wave at the trailing edge of said surface, said shock wave being inclined at an acute angle to said surface, said engine having an air inlet duct located beneath and in close proximity to said plane surface with the face of said duct being positioned downstream from said shock wave and ahead of said expansion wave in a plane perpendicular to the plane containing said plane surface, whereby flow conditions are stabilized and rendered uniform across the face of said duct.

2. A supersonic aerial vehicle of the jet-propelled type comprising, an airframe, a ramjet engine on said airframe and propelling the vehicle supersonically, and an airfoil mounted on said airframe, said airfoil having a plane lower surface and developing a shock wave at the leading edge of said surface and an expansion wave at the trailing edge of said surface, said engine having a diffuser including an inlet duct and an inner body positioned within said duct so that a portion of said body extends in the upstream direction from said duct, said diffuser being carried by said vehicle beneath said airfoil and in close proximity to said plane surface thereof with the forward extremity of said inner body located downstream from said shock wave and with said inlet duct being positioned forward of said expansion wave at the trailing edge of said surface, whereby flow conditions are stabilized and static pressure is increased at the inlet to the diffuser.

References Cited in the file of this patent

UNITED STATES PATENTS

| | | |
|---|---|---|
| D. 171,290 | Bergen et al. | Jan. 19, 1954 |
| D. 177,029 | Frost et al. | Mar. 6, 1956 |
| 2,540,594 | Price | Feb. 6, 1951 |

FOREIGN PATENTS

| | | |
|---|---|---|
| 1,045,231 | France | June 24, 1953 |
| 1,094,935 | France | Dec. 15, 1954 |